July 21, 1925.
A. A. GLIDDEN ET AL
1,546,648
HANDLE FOR HARD RUBBER BATTERY BOXES
Filed April 21, 1923
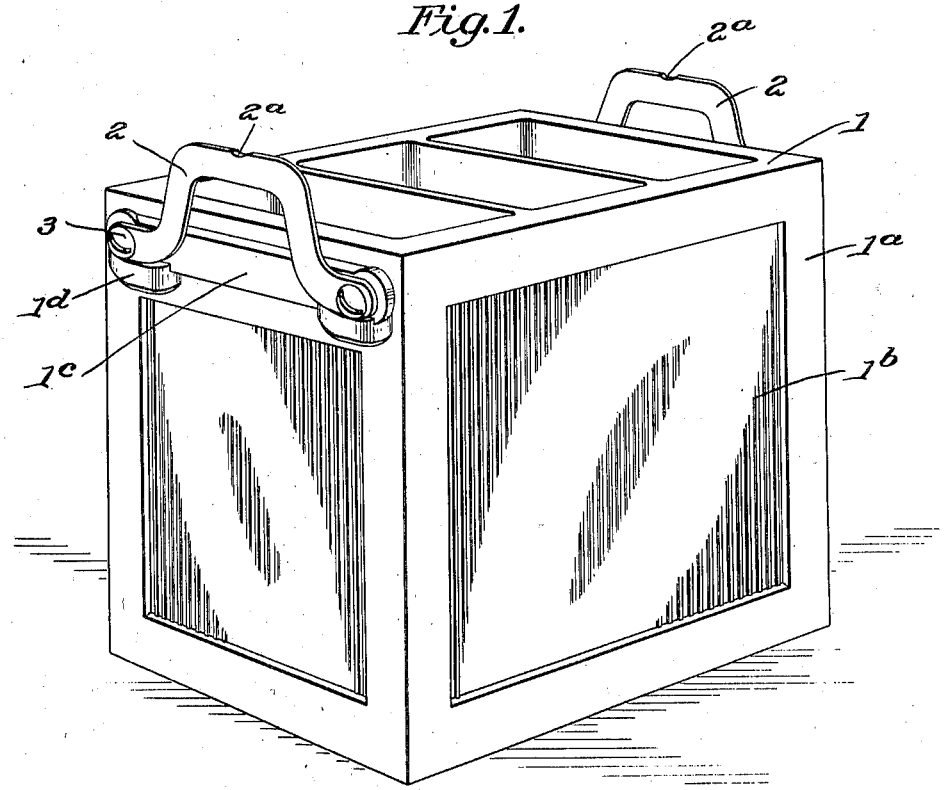
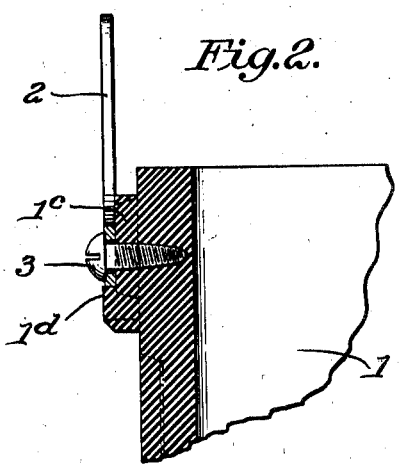
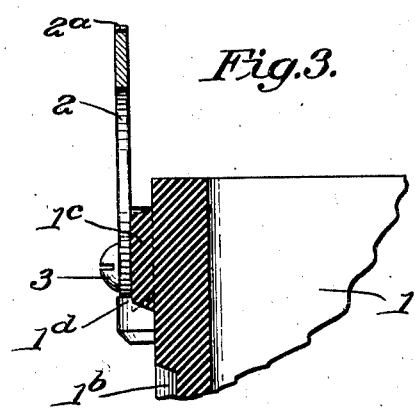
Inventors:
Alfred A. Glidden,
Joseph E. Perrault,
by their Attys.

Patented July 21, 1925.

1,546,648

UNITED STATES PATENT OFFICE.

ALFRED A. GLIDDEN AND JOSEPH E. PERRAULT, OF WATERTOWN, MASSACHUSETTS, ASSIGNORS TO HOOD RUBBER COMPANY, OF WATERTOWN, MASSACHUSETTS, A CORPORATION OF MASSACHUSETTS.

HANDLE FOR HARD-RUBBER BATTERY BOXES.

Application filed April 21, 1923. Serial No. 633,722.

To all whom it may concern:

Be it known that we, ALFRED A. GLIDDEN and JOSEPH E. PERRAULT, citizens of the United States, and residents of Watertown, in the county of Middlesex and State of Massachusetts, have invented certain new and useful Improvements in Handles for Hard-Rubber Battery Boxes, of which the following is a specification.

Our present invention relates to improvements in battery boxes of hardened plastic material and is particularly designed for embodiment in boxes or cases of the type which are used as secondary batteries for motor vehicles and which are now commonly made of hard rubber, though the invention is not limited to such use or specific material.

The invention aims to provide a construction which will be strong and durable and proof against warping and in which the metal handle will be so secured to the box that it will afford the requisite strength to withstand the action of the hold-down devices.

With these and other objects in view, the invention includes the novel features of construction and arrangement and combination of parts hereinafter described, the nature and scope of our invention being particularly defined by the appended claim.

An embodiment of our invention is illustrated in the accompanying drawings, in which:—

Figure 1 is a perspective view of the battery box, and

Figs. 2 and 3 are sectional details.

Referring by reference characters to these figures, the numeral 1 designates the battery box, which is molded as a homogenous, or one-piece article. The side and end walls are provided with thickened marginal portions $1^a$ leaving counter-sunk wall portions or panels, as indicated at $1^b$, these thickened portions strengthening the box without adding undue weight thereto. Each of the end walls is provided on the exterior face of its upper thickened portion with an integral lengthwise rib $1^c$ beneath which are projecting ridges or abutments $1^d$. The handle members are indicated at 2 and are of the shape shown in the drawings, having an upwardly deflected intermediate portion projecting above the top of the battery box in position to be grasped by the hands, these upwardly projecting portions being preferably notched as at $2^a$ to receive the hold-down clamps. The ends of the handle members are designed to lie against the outer face of the rib $1^c$ and be secured thereto by ordinary metal screws 3, and these handle ends are so secured that their bottom edges rest against the upper surface of the projecting ledges $1^d$. By this arrangement all of the downward strain of the hold-down clamps is carried by the projecting ledges, and the hold-down screws are only required to carry the lifting strain. By reason of this fact it is possible to use an ordinary wood or tinsmith screw which may be screwed through the corresponding hole in the handle and directly into the wall of the box, no metal insert being required, as has heretofore been the case in constructions of which we are aware.

Having thus described our invention, what we claim is:—

A battery box having on the end thereof an integral longitudinal rib and ledges at the opposite ends thereof, and a one-piece handle member having its ends resting against said ledges and secured directly to the face of said rib.

In testimony whereof, we affix our signatures.

ALFRED A. GLIDDEN.
JOSEPH E. PERRAULT